United States Patent [19]
Posey et al.

[11] 3,715,661
[45] Feb. 6, 1973

[54] INDICATING METER WITH VISUAL ALARM

[75] Inventors: Alfred Henry Posey, West Haven; Harry Clifford Quick, Jr., Weston, both of Conn.

[73] Assignee: Sigma Instruments, Inc., Braintree, Mass.

[22] Filed: March 24, 1969

[21] Appl. No.: 809,602

[52] U.S. Cl. .................... 324/115, 324/133, 340/266
[51] Int. Cl. ........................ G01r 15/08, G01r 19/14
[58] Field of Search ...... 324/115, 103, 103 P, 96, 97, 324/150, 133, 156, 157; 340/266; 116/74, 116; 73/499

[56] References Cited

UNITED STATES PATENTS

| 2,153,986 | 4/1939 | MacLarh, Jr | 324/115 X |
| 2,365,601 | 12/1944 | Sipman | 340/266 X |
| 2,383,321 | 8/1945 | Kleber | 340/266 X |
| 2,659,070 | 11/1953 | Gallo | 340/266 |
| 3,435,341 | 3/1969 | Baron et al. | 324/96 X |
| 1,704,520 | 3/1929 | Sommer | 324/157 X |
| 2,107,936 | 2/1938 | Gardner | 324/97 X |
| 3,332,014 | 7/1967 | Orths et al. | 324/157 |
| 2,512,330 | 6/1950 | Hendrich | 324/115 X |
| 2,535,279 | 12/1950 | Folk | 324/115 X |
| 2,661,260 | 12/1953 | Salzman | 324/115 X |

FOREIGN PATENTS OR APPLICATIONS

| 522,982 | 4/1931 | Germany | 324/96 |

*Primary Examiner*—Rudolph V. Rolinec
*Assistant Examiner*—Ernest F. Karlsen
*Attorney*—McGlew and Toren

[57] ABSTRACT

An indicating meter with an indicating member movable over a scale provides a visual alarm when the indicating member enters a selected range of the scale. One or more light sources are provided in the meter, and the indicating member member carries one or a pair of arcuate masks, symmetrically on either side of the indicating member, and spaced by a predetermined angular or arcuate distance. The single mask or each of the pair of masks blocks light from a respective source from illuminating the scale unless the indicating member is in a respective selected range of the scale. Mask means are mounted on the meter casing, and are adjustable as to length, and these mask means cooperate with the mask or masks carried by the indicating member. The scale is translucent or transparent, and the illumination of the selected range of the scale, when the indicating member moves into such range, provides a visual alarm. If desired the visual alarm may be a colored illumination. In a modification, a photocell arranged in a suitable electronic circuit with one or more transistors is arranged to effect the illumination of a lamp when the indicating mark enters a selected range or one of two or more selected ranges of the scale.

15 Claims, 9 Drawing Figures

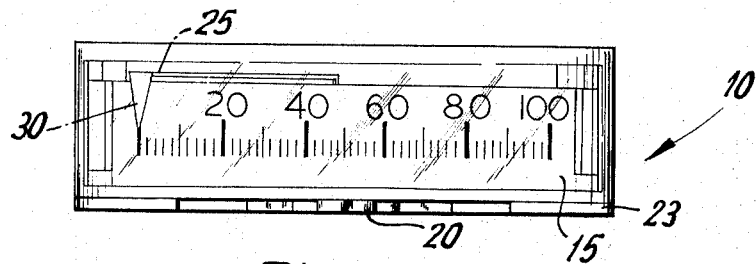
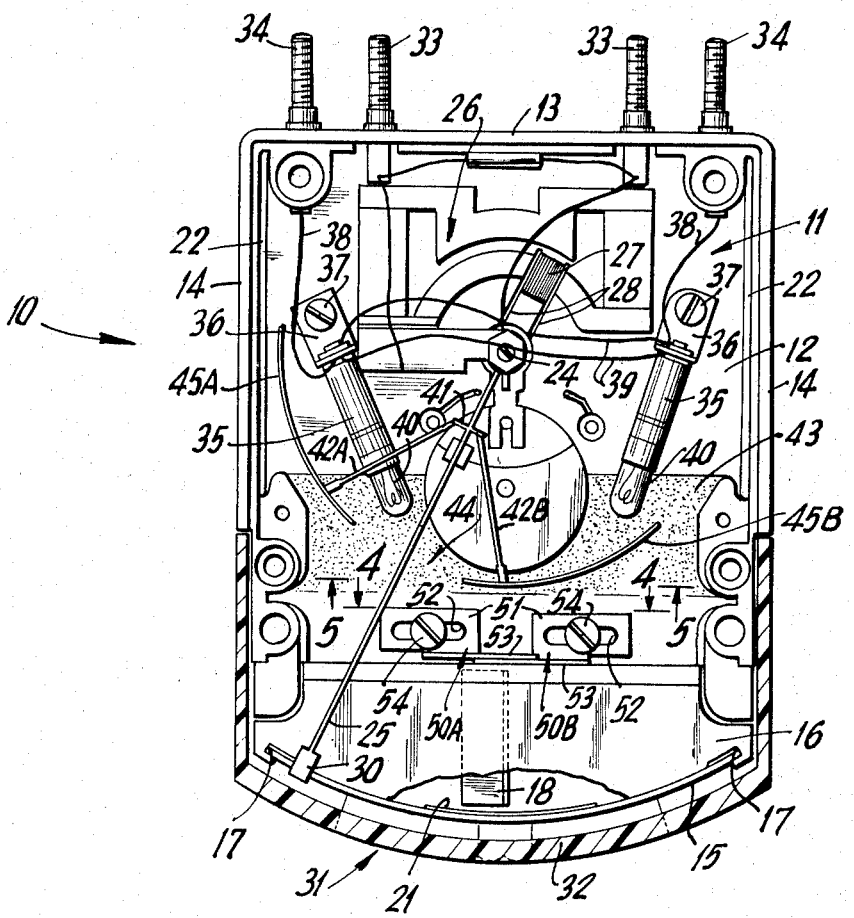
INVENTORS
ALFRED HENRY POSEY
HARRY CLIFFORD QUICK, JR.
BY
*McGlew & Toren*
ATTORNEYS INVENTORS
ALFRED HENRY POSEY
HARRY CLIFFORD QUICK, JR.
BY
McGlew & Toren
ATTORNEYS

INVENTORS
ALFRED HENRY POSEY
HARRY CLIFFORD QUICK, JR.
BY

McGlew & Toren
ATTORNEYS

INDICATING METER WITH VISUAL ALARM

BACKGROUND OF THE INVENTION

There are known types of indicating meters for providing, by mechanical, electrical, or electronic means, an indication, and usually a control signal, responsive to the magnitude of a measured quantity attaining a preselected value, such as a lower or upper limiting value. This type of indicating meter, while effective in operation, is relatively expensive and complicated in construction.

In addition, there are also known indicating meters in which the indication is provided by a spot or line of light movable along a light permeable scale, but known meters of this type are used only for indicating purposes. As a variation, there has been provided an indicating meter of this type which, when the indication moves beyond the ends of the scale in either direction, provides a fixed light signal. However, this latter type of meter does not indicate when the magnitude of the quantity has attained a preselected value in either direction, but only that the reading of the indicating meter has passed beyond the ends of the scale.

SUMMARY OF THE INVENTION

This invention relates to indicating meters and, more particularly, to a novel and improved indicating meter providing a visual signal when the indication is within a preselected range or ranges.

In accordance with the invention, an indicating meter is provided with a transparent or translucent scale, and mask or shutter means are movable with the indicating pointer or the like These masks or shutter means cooperate with fixed but adjustable mask or shutter means in the casing of the meter, and with one or more lamps positioned in the casing. The two sets of masks or shutter means are so correlated that, for example, the light from the lamps is effective to illuminate the transparent or translucent scale only when the indicating pointer is adjacent either end thereof. However, the mask or shutter means can be so arranged that light from the lamp or lamps is effective to illuminate any selected range of the transparent or translucent scale when the indicating pointer is within such range.

More particularly, in one embodiment of the invention, a pair of arms are movable, for settings for different visual alarms, with respect to the indicating pointer, and are preferably equi-angularly spaced on either side of the indicating pointer. Each one of these arms carries an arcuate mask or shutter, preferably colored black, with the center of the radius of curvature of the masks or shutters coinciding with the axiS of rotation of the indicating pointer. The masks or shutter are so arranged as to provide a gap between the two masks or shutters and extending to either side of the indicating pointer. A pair of small lamps are mounted in the casing behind the masks of shutters and are oriented to direct light toward either end of the transparent or translucent scale.

A pair of fixed shutters or masks are mounted in the casing between the movable masks or shutters and the scale, and these fixed masks or shutters can be adjusted relative to each other to block a selected intermediate portion of the scale from impingement of light thereupon, thus in effect constituting means for adjusting the illuminated ranges of the scale at either end of the latter. These fixed shutters are also preferably colored black.

As the indicating pointer swings from one end of the scale to the other, it is only when the indicating pointer is within a preset or predetermined range of the scale that the gap or opening between the arcuate shutters provides for light from one or the other of the lamps to illuminate that range of scale in which the indicating pointer is then positioned. The length of this range is selected by adjustment of the fixed shutters or masks, or by adjustment of the lamps.

In an alternative embodiment of the invention, a photoelectric switch is provided in association with an amplifier to control energization of a lamp effective to illuminate only the selected limited scale range. In this embodiment of the invention, the lamp thus is illuminated to illuminate the preselected scale range only when an indicating pointer is in the preselected range of the scale.

In a further embodiment of the invention, control of the illumination of the lamps is effected by an electronic switch including two coils spaced to have a mask or vane on the pointer moved therebetween. One coil is mounted in the base circuit of a transistor, and the second coil is mounted in the collector circuit of the same transistor so that the coils provide a 180° phase relation between the voltage of the base and collector. The system oscillates as long as the mutual inductance between the coils is sufficiently large to maintain the oscillations. When the mask or vane is introduced between the coils, the mutual inductance decreases and the system stops oscillating. In turn, this is used to control the illuminating of the lamps.

An object of the invention is to provide an improved indicating meter with a visual indication of a selected scale value.

Another object of the invention is to provide such an indicating meter in which, when an indicating pointer is in a selected range of a transparent or translucent scale, that range of the scale is illuminated.

A further object of the invention is to provide such an indicating meter providing a visual alarm when the indicating pointer enters a particular range of a scale, and which is simple and effective in construction.

Another object of the invention is to provide such an indicating meter for providing a visual alarm and incorporating a photocell controlling energization of a relay or other switching device in turn controlling energization of a lamp to illuminate a selected range of a scale when the indicating pointer of the meter enters this range.

A further object of the invention is to provide such an indicating meter for providing a visual alarm, and incorporating an electronic switch including two coils whose mutual inductance is varied when a mask or vane on an indicating pointer is introduced between the two coils.

For an understanding of the principles of the invention, reference is made to the following description of typical embodiment thereof as illustrated in the accompanying drawings.

BRIEF DESCRIPTION OF THE DRAWINGS

In the Drawings:

FIG. 1 is a front elevational view of one form of meter embodying the invention;

FIG. 2 is a top plan view of the meter, with a top cover removed and showing an indicating pointer in one extreme position;

DESCRIPTION OF THE PREFERRED EMBODIMENTS

Figure 3:
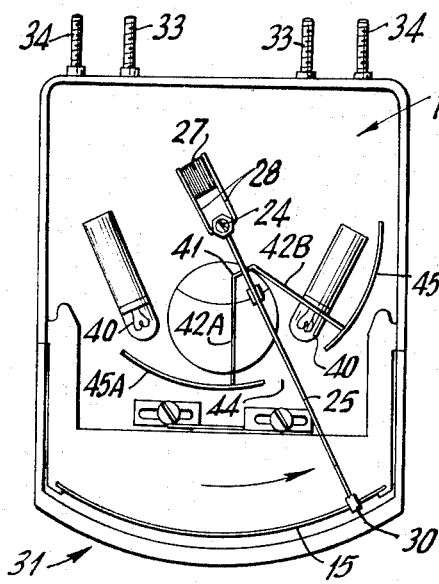
FIG. 3 is a simplified top plan view of the meter illustrating the indicating pointer in the opposite extreme position.

In the drawings, the invention is illustrated as applied to an indicating meter which is generally of the type shown and described in Podoloff, U.S. Pat. No. 2,871,450, issued Jan. 27, 1959. However, it should be understood that the principles of the invention are applicable equally to any other type of indicating meter having a scale and a pointer movable over the scale, the application to the Podoloff type meter being selected merely by way of example.

Referring first to FIGS. 1 through 5, in these figures the invention is illustrated as incorporated in an electrical measuring instrument 10, of the type shown in the Podoloff patent, and including a casing 11 which may be formed of suitable dielectric plastic composition material. Casing 11 includes a base 12, a rear wall 13 and side walls 14. Adjacent their forward ends, side walls 14 are recessed or offset inwardly, for a purpose to be described, and casing 11 includes an upper wall portion 16 interconnecting the forward portions of side walls 14 and having an arcuate front edge. The front ends of side walls 14 are formed with inwardly facing grooves 17 which serve to seat the ends of a transparent or translucent scale 15 which is curved to extend along the curved front edge of partition 16. Scale 15 has a relatively short magnetic shield 21 on is rear surface adjacent its center, and adjacent a partition 18 extending between base 12 and partition 16. Magnetic shields 22 extend along the inner surface of each side wall 14, with their ends seated in suitable grooves or channels.

A metal plate 23 overlies the outer surface of the base 12 of casing 11, and this plate is substantially rectangular in overall outline and has a configuration such as illustrated at 7 in FIG. 1 of the mentioned Podoloff patent. Thus, plate 23 is shaped to receive the zero adjusting lever 20 which has a shape and mounting which are identical with the zero adjusting lever 53 shown in FIG. 1 of the Podoloff patent. The details of plate 23 and lever 20 form no part of the present invention, and are substantially identical with the corresponding parts of the instrument shown in the Podoloff patent.

An indicator or needle 25 is mounted to pivot about an axis which is the center of the radius of curvature of scale 15, the pivot axis 24 of indicator 25 being suitably mounted on a meter movement generally indicated at 26, which is preferably a magnetic structure operatively associated with a moving coil 27 carried by a rearwardly projecting arm 28 of indicator 25. The details of meter movement 26 and its association with moving coil 27 are fully described in the Podoloff patent, so that further description is not believed necessary as this meter movement actually forms no part of the invention.

Indicator 25 has a down turned outer end 30 which is in the form of a pointer and overlies scale 15. A protective shield 31, formed of transparent plastic material, is telescoped over the side walls 14 at their recessed outer ends and also overlies 'he upper ends of the side walls and underlies that portion of base 12 which is not covered by metal plate 23. Shield 31 has an arcuate front wall 32 which overlies scale 15 and pointer 30 of indicator 25, the upper wall of shield 31 being spaced sufficiently from partition 16 to provide for free movement of indicator 25. The electrical quantity to be measured is applied to meter movement 26 through a pair of inner terminals 33 mounted on rear Wall 13 of casing 12 and connected as indicated to the meter movement. A pair of outer terminals 34 are also mounted on rear wall 13, for a purpose which will be described.

In accordance with the invention, a pair of lamp sockets 35 include mounting brackets 36 which are adjustably secured to base 12 of casing 1 by suitable screws or the like 37. Brackets 35 are mounted on base 12 adjacent either forward end edge of meter movement 26. The sockets are relatively elongated and each socket mounts an indicating lamp 40, the sockets preferably being so adjusted that they converge toward each other toward the forward end of instrument 10. Loosening screws 37, the angular relation of the sockets can be readily adjusted. Conductors 38 connect one terminal of one lamp 40 to a first terminal 34 and the opposite terminal of the other lamp 40 to a second lamp terminal 34 and conductors 39 interconnect the two lamps in such a manner that the lamps are connected in parallel between the lamp terminals 34.

In further accordance with the invention, indicator 25, at a relatively short distance from its pivot 24, is provided with a transversely extending cross arm 41, and each end of cross arm 41 has extending therefrom, in diverging relation with respect to indicator 25, a respective support arm 42A or 42B. The outer end of each support arm 42A and 42B carries a respective arcuate shutter or mask 45A or 45B, the radius of curvature of these masks extending substantially through the pivot 24. The masks 45A and 45B are spaced angularly from each other so as to leave a gap therebetween extending to either side of indicator 25. The masks are colored black, and beneath the masks there is a blackened area 43 on base 12 extending between side walls 14 and extending upwardly of the side walls at each end of the blackened area 43.

In FIG. 2, indicator pointer 30 is shown at the zero end of scale 15, and, in this position of the parts, gap 44 between the shutters 45A and 45B is adjacent the left hand lamp 40 as viewed in FIG. 2. FIG. 3 illustrates the parts in the position where indicator pointer 30 is at the upper end of scale 15 and, in this case, gap 44 is adjacent the right hand lamp 40, as viewed in FIG. 3. Thus, in the position of the part shown in FIG. 2, light from the left hand lamp 40 is not blocked by the shutters, and, in the position of FIG. 3, light from the right hand lamp 40 is not blocked by the shutters.

Figure 4:
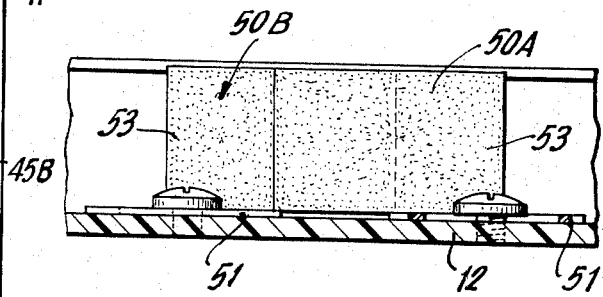
FIGS. 4 and 5 are views taken on the correspondingly numbered lines of FIG. 2.
Figure 5:
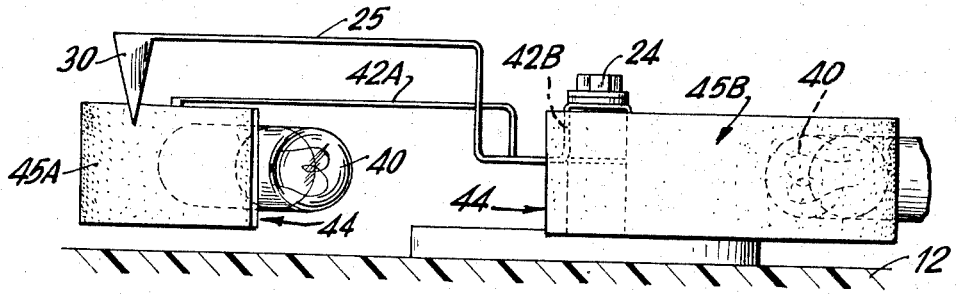

In addition to the movable shutters 45A and 45B, the invention arrangement includes a pair of fixed, but relatively adjustable shutters or masks 50A and 50B. As best seen in FIGS. 2, 3 and 4, each of these shutters 50A an: 50B is in the form of angle including a base leg 51 formed with an elongated slot 52 and an upright leg 53. Shutters 50A and 50B are adjustably mounted on base 12 through the medium of screws or the like 54, so that the overall length of the two shutters which have their extended vertical legs 53 in overlapped relation, as best seen in FIG. 4, can be readily adjusted. It will be noted that shutters 50A and 50B are located generally in a central position considered laterally of casing 11.

The arrangement illustrated in FIGS. 1 through 5 operates in a manner which will now be described. When the instrument is connected, lamps 40 are illuminated. However, the arrangement of the shutters 45 and 50 is such that light from the lamps 40 can illuminate the transparent or translucent scale 15 only in a short range at each end of the scale and when the indicating pointer 30 is in either of these ranges. Thus, in the position of the parts shown in FIG. 2, light from the lamp 40 can pass through the gap 44 and around the left hand edge of the adjustable shutter arrangement to illuminate a relatively small range at the lower end of scale 15. In a position of the parts intermediate the position shown in FIGS. 1 and 2, light from both lamps 40 is blocked, by shutters 45A and 45B in cooperation with shutters 50A and 50B so that the scale 15 is not illuminated. When pointer 30 moves into a limited range at the upper end of scale 15, as illustrated in FIG. 3, light from the right hand lamp 40 can pass through the gap 44 and pass the right hand edge of the adjustable shutter arrangement to illuminate a limited range of scale 15 at the upper end thereof. The illumination of either the lower range or the upper range of scale 15 serves as a visual alarm to an operator.

Figure 6:
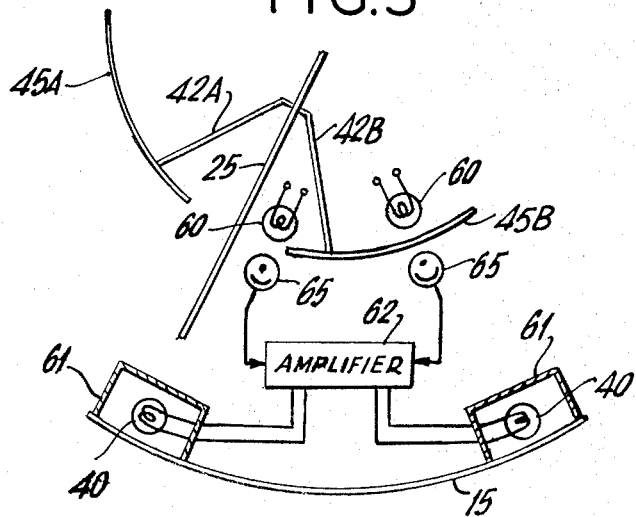
FIG. 6 is a part plan view and part schematic wiring diagram of another form of indicating meter embodying the invention.

Instead of illumination of the preselected scale ranges by the lamps 40 being controlled directly by shutters 45A and 45B, the illumination of the lamps 40, when indicator 25 is in the respective selected ranges of scale 15, may be effected by photoelectric switch means, as shown in FIG. 6. Referring to FIG. 6, a pair of lamps 60 are provided at substantially the respective locations of lamps 40 in FIG. 1, and each lamp 40 has operatively associated therewith a photocell 65 to constitute a photoelectric switch. Each lamp 40 is enclosed in a light-proof housing 61 having an opening extending along a respective preselected limited range of scale 15. The outputs of photocells 65 are applied to an amplifier 62 which controls illumination of lamps 40. Otherwise, the arrangement of FIG. 6 corresponds to that of FIG. 1.

When indicator 25 is in a respective preselected limited range of scale 15, such as the lower limited range as indicated in FIG. 6, the gap between shutters 45A and 45B provides for light from a lamp 60 to be incident upon a photocell 65 Through amplifier 62, this energizes the left lamp 40 to illuminate the lower selected range of scale 15.

Figure 7:
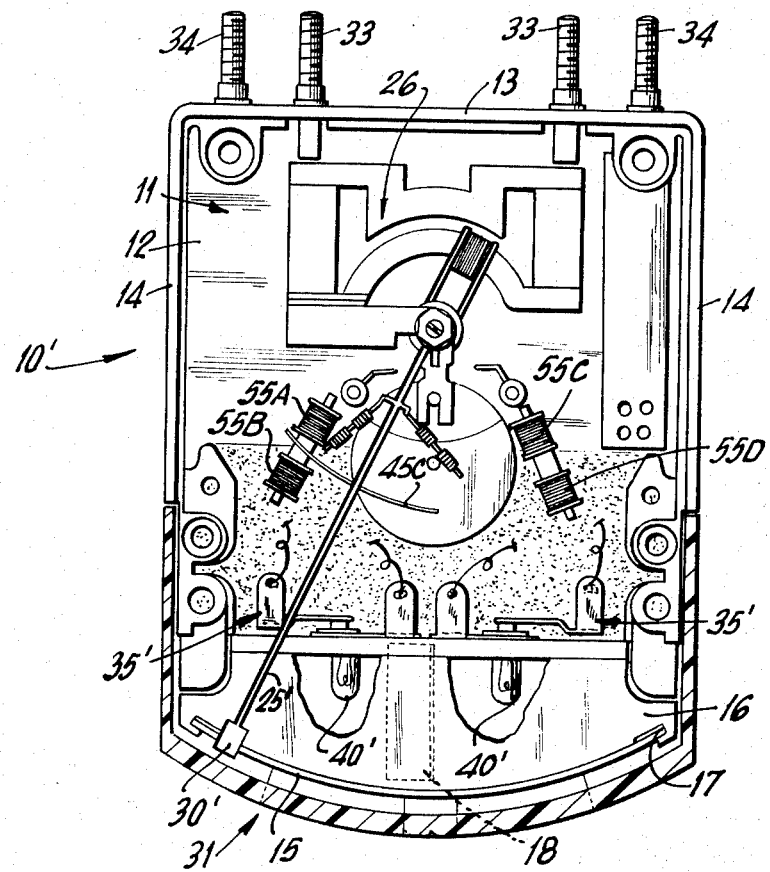
FIG. 7 is a top plan view, similar to FIG. 1, illustrating a further embodiment of the invention.
Figure 8:
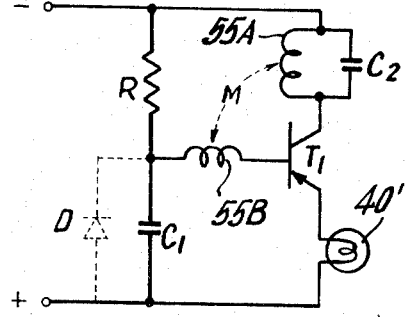
FIGS. 8 and 9 are schematic wiring diagrams of two different forms of electronic switch included in the embodiment of the invention shown in FIG. 7.
Figure 9:
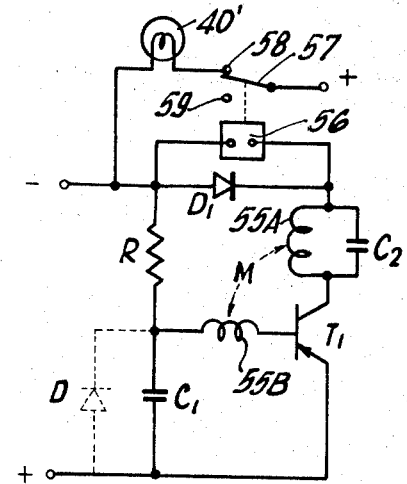

In the embodiment of the invention shown in FIGS. 7, 8 and 9 lighting of a lamp or lamps, when the pointer or indicator is within a preselected range of the scale, to illuminate such preselected range, is accomplished by varying the mutual inductance between a pair of windings included in an oscillating circuit. The mutual inductance is varied by a vane or mask on the indicating pointer entering between the two coils or windings when the indicating pointer is within the preselected scale range. An inStrument in accordance with this embodiment of the invention is shown in plan in FIG. 7. As the instrument shown in FIG. 7 is, in most particulars, identical with that shown in FIGS. 1 and 2, the details thereof will not be described and reference will be made only to the differences between the instrument of FIG. 7 and that shown In FIGS. 1 and 2.

Two lamps 40' are provided, and are mounted in respective combination sockets And brackets generally indicated at 35'. Each lamp 40' is positioned on one respective side of the partition 18 extending between base 12 and partition 16. Consequently, each lamp 40' is effective to illuminate substantially one half of a scale 15.

The arms 42A and 42B, carrying respective vanes 45A and 45B, as used in the embodiment shown in FIGS. 1 and 2, are omitted in the embodiment of FIG. 7. Instead, indicating pointer 25' carries a single arcuate vane 45C which extends substantially equal distances to either side of indicating pointer 25'. Vane 45C preferably is made of electrically conductive metal, for cooperation with two pairs of coils.

In the particular embodiment of the invention illustrated in FIG. 7, it is intended that one of the lamps 40' will illuminate scale 15 when indicating pointer 25' is in a selected small range of the scale adjacent either the upper end or the lower end thereof. For this purpose, a pair of first coils 55A and 55B are arranged in spaced, aligned and facing relation at a position such that, when indicating pointer 25' enters a small range at the lower end of scale 15, the left hand portion of vane 45C, as viewed in FIG. 7, will extend between coils 55A and 55B. Similiarly, a second pair of coils 55C and 55D are arranged at a position wherein the right hand portion of vane 45C will extend therebetween when indicating pointer 25' is in the small range adjacent the upper end of scale 15. One lamp 40' is energized under the control of the coils 55A and 55B, and the other lamp 40' is energized under the control of the coils 55C and 55D.

The operation of the instrument shown in FIG. 7 will be clear when reference is made to the electronic switches shown in FIGS. 8 and 9. Each of these figures shows the electronic switch for one of the lamps 40', and it will be understood that a duplicate electronic switch is provided for the other lamp 40'. Thus, only the electronic switch including the windings or coils 55A and 55B will be described.

The electronic switches shown in FIGS. 8 and 9 are based on the principle that the vane 45C, when entering between the coils or windings 55A and 55B, one connected in the base circuit of a transistor T1 and the other connected in the collector circuit of transistor T1, with the connections being made so that there is a 180° phase angle between the voltages of the base and the collector, the mutual inductance M between the winding 55A and 55B will be changed. In both FIG. 8 and FIG. 9, the system oscillates as long as the mutual inductance M is large enough to maintain the oscillations. When vane 45C is introduced between windings 55A and 55B, the mutual inductance M decreases and the system stops oscillating. When the system oscillates, the entire voltage is dissipated across the collector load.

In the arrangement of FIG. 8, the load or lamp 40' is connected in the emitter circuit of transistor T1. In this case, when the system oscillates, the lamp 40' will be deenergized, and lamp 40' will be energized as soon as the oscillations cease. As the oscillations cease when vane 45C enters between windings 55A and 55B, lamp 40' will thus be energized when indicating pointer 25' is in the relatively small range at the lower end of scale 15.

In the arrangement of FIG. 9, since the drop across the oscillating circuit can be kept at a minimum, most of the voltage will be dissipated across the load which, in this case, is the Winding of a relay 56 having an armature 57 which is normally engaged with a back contact 58. When armature 57 engages back contact 58, an energizing circuit for lamp 40' is completed. When the system is oscillating, relay 56 will be energized to engage armature 57 with front contact 59 and thus deenergize lamp 40'. However, if the oscillations stop, as when vane 45C enters between coils 55A and 55B, relay 56 will be deenergized to engage its armature 57 with back contact 58 and thus lamp 40' will be energized.

It should be noted that, with proper biasing, using diodes in the base circuit, the electronic switches can be temperature stabilized over a range of −10° to +60° C.

What is claimed is:

1. An indicating instrument, comprising a housing; a light permeable scale on said housing and carrying indicia; an indicator mounted in said housing and movable along said scale to indicate the magnitude of the quantity to be measured; an input quantity responsive mechanism connected to said indicator to move the same along said scale; a light source for illuminating only a selected range of said scale and which is less than the full length of said scale; means operatively associated with said indicator and operable, when said indicator is scanning indicia in said selected range of said scale, to control said light source to effect the illumination of only the indicia then scanned by said indicator, to provide a visual warning that the measured quantity has attained a preselected magnitude; said last named means including shutter means carried by said indicator and interposed between said light source and said scale; and second shutter means mounted in said housing and interposed between said first shutter means and said scale, said second shutter means blocking light from said source from illuminating any portion of said scale except said selected range of said scale; said second shutter means being adjustable to adjust the length of that portion of the scale which is blocked from illumination with said light source by said second shutter means.

2. An indicating instrument comprising a housing; a light permeable scale on said housing and carrying indicia; an indicator mounted in said housing and movable along said scale to indicate the magnitude of the quantity to be measured; an input quantity responsive mechanism connected to said indicator to move the same along said scale; a light source for illuminating only a selected range of said scale and which is less than the full length of said scale; and means operatively associated with said indicator and operable, when said indicator is scanning indicia in said selected range of said scale, to control said light source to effect illumination of the indicia then scanned by the indicator, to provide a visual warning that the measured quantity has attained a preselected magnitude; said selected range of said scale including a pair of selected ranges spaced apart longitudinally of said scale; said light source including a pair of lamps mounted in said housing and each positioned to illuminate a respective selected range of said scale; said indicator being pivotal about an axis; said last named means including arcuate shutter means carried by said indicator and centered on the axis thereof, said shutter means extending on respective opposite sides of said indicator and defining a light passage extending to either side of said indicator; the passage being aligned with a respective lamp only when said indicator is in a respective one of said selected ranges of said scale.

3. An indicating instrument, as claimed in claim 2, including shutter means interposed between said shutter and said scales and blocking light from said lamps illuminating that portion of said scale included between said selected ranges at either end thereof.

4. An indicating instrument, as claimed in claim 3, in which said shutter means includes a pair of stationary shutters mounted in said housing in overlapping relation; and means providing for adjustment of said stationary shutters relative to each other to adjust the length of the portion of the scale from which light from said lamp is blocked by said stationary shutters.

5. An indicating instrument, as claimed in claim 4, in which each of said stationary shutters comprises an angular cross section member having a base leg and an upright leg; each of said base legs being formed with a relatively elongated slot receiving releasable fastening means securing the respective stationary shutter in said housing.

6. An indicating instrument, as claimed in claim 2, in which each of said lamps is mounted in a respective socket, and means adjustably securing said sockets in said housing to provide for adjustment of the relative orientation of said lamps.

7. An indicating instrument comprising a housing; a light permeable scale on said housing and carrying indicia; an indicator mounted in said housing and movable along said scale to indicate the magnitude of the quantity to be measured; an input quantity responsive mechanism connected to said indicator to move the same along said scale; a light source for illuminating only a selected range of said scale and which is less than the full length of said scale; means operatively associated with said indicator and operable, when said indicator is scanning indicia in said selected range of said scale, to control said light source to effect illumination of only the indicia then scanned by said indicator, to provide a visual warning that the measured quantity has attained a preselected magnitude; said last-named means comprising a vane carried by said indicator for movement therewith, a pair of inductive windings arranged in spaced facing relation for passage of said vane therebetween when said indicator is scanning indicia in said selected range of said scale, said pair of windings having a substantial mutual inductance therebetween which is greatly decreased when said vane enters between said windings, a transistorized oscillator including a transistor having one of said windings in its collector circuit and the other of said windings in its emitter circuit, whereby said oscillator circuit will oscillate due to said mutual inductance except when said vane extends between said windings, and an energizing circuit for said light source including said transistorized oscillator circuit and effective to energize said light source upon cessation of oscillation of said transistorized oscillator circuit.

8. An indicating instrument, as claimed in claim 7, in which said light source is an electrically energized lamp connected in the emitter circuit of said transistor.

9. An indicating instrument, as claimed in claim 7, in which said energizing circuit includes a relay connected in the collector circuit of said transistor and having a back contact included in an energizing circuit for an electrically energized lamp constituting said light source.

10. An indicating instrument, as claimed in claim 7, in which there are two pairs of said windings and two selected ranges of said scale spaced apart longitudinally of said scale; said vane extending to either side of said indicator; each pair of windings controlling energization of a respective light source associated with a respective selected range of said scale.

11. An indicating instrument comprising housing means, a scale in said housing means, said scale carrying indicia and being divided into ranges, indicator means mounted in said housing means and having a portion movable along said scale to indicate the magnitude of the quantity to be measured, said portion of said indicator means being movable out of one range and into another, input quantity responsive means connected to said indicator means to move said portion of said indicator means along said scale, light source means for illuminating a selected range of said scale, said ranges each being less than the full length of said scale but greater than said portion, and control means responsive to said indicator means for controlling the illumination of said light source means to light the indicia then scanned by the portion of said indicator means only when said portion of said indicator means is scanning a selected range of said scale, and second control means associated with said light source means for inhibiting illumination when said detector means is scanning outside of said selected range, said scale extending continuously over a single path in a single direction.

12. An indicating instrument, as claimed in claim 11, including photoelectric switch means controlling energization of said light source; said last-named means including shutter means carried by said indicator and operatively associated with said photoelectric switch means.

13. An indicating instrument as in claim 11, wherein said control means includes shutter means carried by said indicator means and interposed between said light source means and said scale.

14. An indicating instrument as in claim 11, wherein said second control means includes light inhibiting means mounted in said housing and interposed between said light Source means and said scale, said light inhibiting means blocking the light of said source means illuminating illuminating any portion of said scale except said selected range of said scale.

15. An indicating instrument, comprising housing means, a light permeable scale on said housing means, said scale carrying indicia, indicator means mounted in said housing means and having a portion movable along said scale to indicate the magnitude of the quantity to be measured, input quantity responsive means connected to said indicator means to move said portion of said indicator means along said scale, light source means for illuminating a selected range of said scale less than the full length of said scale but greater than said portion, first control means responsive to said indicator means for controlling the illumination of said light source means to light the indicia then scanned by the portion of said indicator means only when said portion of said indicator means is scanning the selected range of said scale, and second control means associated with said light source means for inhibiting illumination when said indicator means is scanning outside of the selected range, said first control means including shutter means carried by said indicator means and interposed between said light source means and said scale, said second control means including light inhibiting means mounted in said housing and interposed between said shutter means and said scale, said light inhibiting means blocking light of said source means from illuminating any portion of said scale except said selected range of said scale.

* * * * *